United States Patent Office 3,692,706
Patented Sept. 19, 1972

3,692,706
FOAMED MATERIALS AND THEIR
PREPARATION
Graham Arthur Igglesden, Saffron Walden, England, assignor to Ciba-Geigy AG, Basel, Switzerland
No Drawing. Filed Jan. 18, 1971, Ser. No. 107,494
Claims priority, application Great Britain, Feb. 6, 1970, 5,946/70; Sept. 10, 1970, 43,399/70
Int. Cl. C08j 1/26
U.S. Cl. 260—2.5 F
33 Claims

ABSTRACT OF THE DISCLOSURE

Phenol-formaldehyde resins containing a blowing agent are foamed and cured without the application of external heat by adding a liquid which reacts exothermically to form a polymer under the influence of the curing agent, a strong acid. Thus, a foam is prepared by mixing the phenol-formaldehyde resin with a liquid, exothermically-reacting substance, especially furfuryl alcohol, and a blowing agent, and then adding a strong acid such as toluene-p-sulphonic acid or phosphoric acid. Optionally, an emulsifying agent and an accelerator may be incorporated.

---

This invention relates to new foamed materials and, more particularly, to new foamed materials derived from curable condensates of a phenol and formaldehyde and to methods for their preparation.

Heretofore, foamed materials derived from condensates of a phenol and formaldehyde have been prepared by mixing a liquid phenol-formaldehyde resin, a blowing agent, optionally a surfactant, and then a curing (i.e. hardening) agent, such as a strong acid, and applying heat to volatilise the blowing agent and harden the resin.

A disadvantage of that method becomes obvious if large sections of rigid, foamed, phenol-formaldehyde condensates are required. Big ovens or a large number of infra-red heaters are required to supply heat evenly over the whole surface. Since the foams possess excellent heat-insulating properties, it is very difficult to supply heat to the interior of a large block of the foamed condensate. Irregular heating results in a non-uniform foam which may be unsuitable for the purpose for which it was intended and which would be structurally weak. Since external heaters or ovens are required to obtain a satisfactory rate of hardening, ("on-site") preparation of foams is difficult, or may even be impossible, and this is a further disadvantage of the method.

In attempts to overcome these drawbacks, other substances have been included in the resin mixture which react exothermically with the curing agent and thus reduce or remove the need for applying heat to cure the resin. Substances which have been so used include phosphorus pentoxide, boron oxide, and calcium carbonate. The last-named also serves as a blowing agent since it releases carbon dioxide on contact with an acid curing agent. However, the exothermically-reacting substances are sometimes unpleasant to handle on an industrial scale, the foams contain inert materials which add to the weight of the product but serve no useful purpose, and since the unfoamed starting mixtures contain solids, it is more difficult to obtain uniform suspensions, which will give uniform foams, than when an all-liquid system is used. This is especially true if a continuous method of foaming is employed.

We have now discovered that a phenol-formaldehyde resin may by foamed and cured without the application of external heat, by adding a liquid which reacts exothermically to form a polymer under the influence of the curing agent. The resultant foam cures readily, is uniform in structure, contains no extraneous inert material, and is prepared from substances which may be handled easily on an industrial scale. The liquid exothermically-reacting substances are those which readily polymerise with evolution of heat on contact with a strong acid used to cure the phenol-formaldehyde resin. Any liquid which fulfils the above requirements may be used, but we have found that unsaturated oxygen-containing heterocycles, especially pyran and furan derivatives, are particularly advantageous since, besides enabling the disadvantages previously mentioned to be overcome, they impart improved physical properties to the foam, in particular making it less friable. Furfuryl alcohol is a particularly useful exothermically-reacting substance. An example of a suitable pyran derivative is (2,3-dihydro-4H-pyran-2-yl)methyl 2,3 - dihydro-4H-pyran-2-carboxylate.

These foams have been found to be particularly useful for heat insulation, especially in the building industry. Previously, phenol-formaldehyde foams have not been used as on-site foamed insulators in the building industry because of the disadvantages mentioned above. The use of foamed polyurethanes is, however, well known in the building industry, and they are convenient to use since they may be hardened at atmospheric temperature. The phenol-formaldehyde foams of the present invention may be used for the purposes for which polyurethane foams are at present used, whilst having three major advantages over them: the starting materials are very much cheaper, they are self-extinguishing so that the addition of flame retardants is unnecessary, and their thermal decomposition products are far less toxic.

These foams have also been found to be useful for the reproduction of patterns. By allowing the resin mixture to foam within a mould, the contours of which it is desired to reproduce, there is formed a female moulding of the pattern. The mouldings so produced may be used in a conventional manner, for example in the production of foundry cores or decorative plaques and surfaces. The patterns which are suitable for this process may be made of any conventional pattern-making material, such as wood, metal, plaster and clay. A particular advantage of producing patterns by this technique is that faithful reproduction is made possible by the formation of a hard, continuous skin at the mould/foam interface.

The phenol-formaldehyde resins used in the present invention are known materials and are resols prepared from formaldehyde and a phenol, more especially phenol itself, generally in a molar ratio phenol; formaldehyde of 1:1.2 to 1:3 and by heating in the presence of an alkali, e.g. sodium hydroxide.

As blowing agents are strongly preferred organic liquids which vaporise at the temperature reached spontaneously by the foaming mixture and which can be finely dispersed, e.g., as an emulsion, in the resin. Generally, the blowing agent will be water-immiscible and will vaporise within the range 30 to 100° C., although liquids with boiling points outside of this range may be used if desired. However, if a liquid with too low a boiling point is used, it will vaporse before the mixture has reached the temperature at which gelation occurs, resulting in the presence of blow-holes and possibly collapse of the foam. Alternatively, if a liquid with too high a boiling point is used, it will not have vaporised fully before the mixture gels, resulting either in a low volume, high density foam or even no foaming at all. If desired, solid blowing agents in finely powdered form which decompose on heating, evolving a gas, may be used, but these can rarely be dispersed sufficiently finely to give a foam having a satisfactory uniform cell structure. The choice of the blowing agent is therefore governed by the particular resin and hardening agent employed, and also by the properties required of the product. The suitability of blowing agents for a particular purpose may readily be found by those skilled in the art.

The hardening agent used in the process of the present invention is a strong acid, in general one having an acid strength, $pK_a$, of 2.2 or less. Any strong acid may be used successfully but for ease of handling and availability it is preferred to use hydrochloric acid, an aromatic sulphonic acid such as toluene-p-sulphonic acid, or phosphoric acid, or mixtures of these acids.

The process of the present invention may be effected in the absence of an emulsifying agent but, for ease of handling, it is preferred to add an emulsifying agent to the resin mixture. Suitable emulsifying agents may be anionic, cationic, or nonionic, but nonionic emulsifying agents are especially preferred.

It is sometimes found, especially if an under-reacted resin is to be foamed, that there is too long a time-lag between gelation of the resin and hardening. This can result in shrinkage of the foam. It has been found that addition of a polyhydric phenol, especially resorcinol, accelerates the hardening of the resin and overcomes this difficulty. If desired, 0.5 to 5% of resorcinol may be added, based on the weight of the resin.

The present invention accordingly provides a process for the preparation of a synthetic resin foam wherein 100 parts by weight of a phenol-formaldehyde resin is mixed with 0.5 to 15 parts by weight of a liquid, exothermically-reacting substance as hereinbefore defined, especially an unsaturated oxygen-containing heterocycle such as a furan or pyran derivative, and 5 to 30 parts by weight of a blowing agent, and the mixture is treated with a strong acid so that the mixture foams and hardens without the application of heat. Optionally, 0.1 to 10 parts of an emulsifying agent, expressed on the basis of 100% active material content, is added to the resin mixture before addition of the strong acid. The foam may be made by an intermittent process or, using known continuous foam-producing apparatus, it may be prepared continuously.

According to a preferred feature of the present invention there is provided a continuous or intermittent process for the preparation of a synthetic resin foam in which 100 parts by weight of a phenol-formaldehyde resin are mixed with 1 to 10 parts by weight of a furan derivative, especially furfuryl alcohol, or a pyran derivative, as the liquid, exothermically-reacting substance, in the presence of 0.1 to 5 parts by weight of an emulsifying agent and 10 to 20 parts by weight of, as blowing agent, a water-immiscible volatile solvent having a boiling point between 30° C. and 100° C., followed by the addition of 10 to 40, and especially 15 to 30, parts by weight of a strong acid.

According to another feature of the invention there is provided a self-expanding, self-hardening mass, for the preparation of foam structures, which comprises an intimate mixture of a phenol-formaldehyde resin, a polymerisable furan or pyran derivative, a blowing agent, and a strong acid.

According to a further feature of the present invention there are provided rigid, lightweight, cellular foams comprising a cured phenol-formaldehyde resin and a furan or pyran derivative polymerised in situ.

According to another feature of the invention there are provided moulds comprising rigid cellular foams of cured phenol-formaldehyde resin and a furan or pyran derivative polymerised in situ.

According to a particularly preferred feature of the present invention there is provided a rigid, lightweight, cellular foam comprising 100 parts by weight of a cured resin prepared from phenol and formaldehyde in the molar ratio of 1:1.2 to 1:3, especially 1:1.2 to 1:2, and 2 to 5 parts by weight of a furan or pyran derivative, more particularly furfuryl alcohol, polymerised in situ.

It is known that conventional phenol-formaldehyde foams may be treated with surfactants to make them water-absorbing. Using a similar method the modified phenol-formaldehyde foams of the present invention may be treated to render them water-absorbing.

The following examples illustrate the invention. All parts are by weight unless otherwise indicated.

EXAMPLE 1

Phenol-formaldehyde resin (100 g., P:F molar ratio 1:1.43), furfuryl alcohol (5 g.), n-pentane (15 g.), polyoxyethylene sorbitan monopalmitate (1 g.), resorcinol (1 g.), and water (10 g.) were mixed together at 15° C. in a beaker to form a uniform emulsion. In a separate vessel, toluene-p-sulphonic acid (10 g.) and 2:1 v./v. concentrated hydrochloric acid-water mixture (15 g.) were mixed and this mixture was added to the resin emulsion. The combined mixture was stirred vigorously for one minute and poured into an open mould 10 x 10 cm. across the base. The mixture commenced to foam 1¼ minutes later and stopped foaming after 3¼ minutes. The maximum internal temperature of the foam was 64.5° C., which was reached after 8 minutes. The height of the foam was 31.8 cm.

EXAMPLE 2

Phenol-formaldehyde resin (100 g., P:F molar ratio 1:1.8), furfuryl alcohol (5 g.), n-pentane (15 g.), polyoxyethylene sorbitan monopalmitate (1 g.) and resorcinol (1 g.) were stirred together in a beaker at 15° C. A mixture of toluene-p-sulphonic acid (20 g.) and 88% phosphoric acid (10 g.) was added and stirred vigorously for 45 seconds. The mixture was poured into an open mould as described in Example 1. The mixture commenced to foam after 50 seconds and was fully hardened after 15 minutes. The maximum temperature of the foam was 68° C., which was reached after 4 minutes. The height of the foam was 33 cm. and its specific gravity was 0.0251.

EXAMPLE 3

Proceeding as described in Example 2 but using 2 g. of furfuryl alcohol instead of 5 g., 3.5 g. of resorcinol instead of 1 g., and petroleum spirit B.P. 40°/60° C. instead of n-pentane, the mixture commenced to foam after 50 seconds and foaming was complete after 2 minutes. The maximum temperature of the foam was 54° C., which was reached after 5½ minutes. The height of the foam was 38.1 cm. and its specific gravity was 0.0193.

EXAMPLE 4

Proceeding as described in Example 2, but using 2 g. of furfuryl alcohol instead of 5 g., 2.5 g. of resorcinol instead of 1 g., and petroleum spirit B.P. 60°/80° C. instead of n-pentane, the mixture commenced to foam after 50 seconds and foaming was complete after 1 minute 20 seconds. The maximum temperature of the foam was 74.5° C., which was reached after 3½ minutes. The height of the foam was 29.2 cm.

EXAMPLE 5

Proceeding as described in Example 2 but using 2 g. of furfuryl alcohol instead of 5 g., petroleum spirit B.P. 40°/60° C. instead of n-pentane, 7.5 g. of toluene-p-sulphonic acid and 10 g. of 2:1 v./v. concentrated hydrochloric acid-water mixture as hardening agent, and without addition of resorcinol, the mixture commenced to foam after 1¼ minutes and foaming was complete after 4 minutes. The maximum temperature of the foam was 53.5° C., which was reached after 7½ minutes. The height of the foam was 34.4 cm.

EXAMPLE 6

Proceeding as described in Example 2 but using a phenol-formaldehyde resin in which the P:F molar ratio was 1:1.6 and using 3.5 g. of resorcinol instead of 1 g., the mixture commenced to foam after 1 minute. Foaming was complete after 3¼ minutes, the maximum temperature of the foam was 51° C., which was reached after 6 minutes. The height of the foam was 38.1 cm.

EXAMPLE 7

Proceeding as described in Example 6, but without the addition of resorcinol and using 10 g. of toluene-p-sulphonic acid with 15 g. of a 2:1 v./v. mixture of concentrated hydrochloric acid and water as the hardening agent, the mixture commenced to foam after 30 seconds and foaming was complete after 4 minutes. The maximum temperature of the foam was 59° C., which was reached after 9 minutes. The height of the foam was 29.2 cm.

EXAMPLE 8

Proceeding as described in Example 6, but using petroleum spirit B.P. 40°/60° C. instead of n-pentane and without addition of an emulsifying agent, the mixture commenced to foam after 1 minute and was complete after 2¾ minutes. The maximum temperature reached by the foam was 62° C., after 5 minutes. The height of the foam was 31.1 cm.

EXAMPLE 9

Phenol-formaldehyde resin (100 parts, P:F molar ratio 1:1.6), furfuryl alcohol (2 parts), polyoxyethylene sorbitan monopalmitate (1 part), n-pentane (15 parts) were mixed together to form a stable emulsion which was stored overnight in an air-tight drum. An acid mixture was prepared from toluene-p-sulphonic acid (10 parts) and a 2:1 v./v. concentrated hydrochloric acid-water mixture (12 parts).

The resin emulsion and acid were fed to a conventional continuous polyurethane foaming machine in the ratio 5:1 by volume. The mixture was discharged into boxes where it foamed and hardened to give a product having a specific gravity of 0.022 to 0.023.

EXAMPLE 10

"Aerophen 0809" (600 g.), furfuryl alcohol (9 g.), petroleum ether (90 g.; boiling range 40-60° C.), and polyoxyethylene sorbitan monopalmitate (6 g.) were mixed together with vigorous stirring to produce a uniform emulsion. "Aerophen 0809" is a phenol-formaldehyde resin manufactured by Ciba (A.R.L.) Ltd., Duxford, Cambridge, and having a P:F molar ratio 1:1.6; the word "Aerophen" is a registered trademark. The emulsion was adjusted to 20° C. and a 2:1 v./v. solution of concentrated hydrochloric acid in water (70 g.) and 70% aqueous toluene-p-sulphonic acid (35 g.) were added. The mixture was stirred vigorously for 30 seconds and then poured into a mould previously sprayed with a silicone mould release agent. The mixture commenced foaming after 20 seconds and was complete after 3 minutes. After a further 30 minutes the foam was removed from the mould as a solid block having a hard surface skin which reproduced exactly the contours of the mould.

EXAMPLE 11

An apparatus for the continuous supply of foaming phenol-formaldehyde resin comprised a mild steel container for storing resin emulsion, situated above, and connected to, a gear pump driven by a variable speed electric motor; a polyethylene container for storing acid hardener, connected to a variable speed peristaltic pump; and a stainless steel mixing head incorporating a peg-type stirrer driven at about 2,400 r.p.m. and fed with both the resin and the hardener by their respective pumps. In this mixing head the resin and hardener flow downwards under gravity and are expelled through a vent in the base.

A resin emulsion was prepared containing phenol-formaldehyde resin (100 parts; P:F molar ratio 1:1.6), furfuryl alcohol (0.5 part), polyoxyethylene sorbitan monopalmitate (1 part), and petroleum ether (7.5 parts; boiling range 40-60° C.). This resin emulsion was stored in the steel container of the apparatus described above.

A hardener solution was prepared from a 1:1 mixture of concentrated phosphoric acid and 70% toluene-p-sulphonic acid, and stored in the polyethylene container of the apparatus described above.

The resin emulsion (696 g. per minute) and acid hardener (138 g. per minute) were fed to the mixing head and discharged at a temperature of 30 to 32° C. The mixture foamed to give a product having a specific gravity of 0.022 to 0.024.

EXAMPLE 12

Phenol-formaldehyde resin (100 g.; P:F molar ratio 1:1.6), (2,3-dihydro-4H-pyran-2-yl)methyl 2,3-dihydro-4H-pyran-2-carboxylate (5 g.; prepared from acrolein dimer by a Tischenko reaction), and n-pentane (15 g.) were mixed together at 15° C. to form a uniform emulsion. In a separate vessel, toluene-p-sulphonic acid (10 g.) and 2:1 v./v. concentrated hydrochloric acid-water mixture (15 g.) were mixed, and this mixture was added to the resin emulsion. The combined mixture was stirred vigorously for 30 seconds and poured into an open mould 10 x 10 cm. across the base. The mixture commenced to foam after 30 seconds and stopped foaming after 3 minutes. The maximum internal temperature of the foam was 63.5° C., which was reached after 8 minutes. The height of the foam was 24 cm.

What I claim is:

1. Process for the preparation of synthetic resin foams which comprises mixing 100 parts by weight of a phenol-formaldehyde resin, 0.5 to 15 parts by weight of (2,3-dihydro - 4H - pyran-2-yl)methyl-2,3-dihydro-4H-pyran-2-carboxylate or furfuryl alcohol to form a polymer under the influence of a curing agent, and 5 to 30 parts by weight of a blowing agent, treating the mixture with a strong acid having a pK$_a$ value of 2.2 or less as the said curing agent, which mixture foams and hardens without the application of heat.

2. Process according to claim 1 wherein 0.1 to 10 parts by weight of an emulsifying agent per 100 parts by weight of resin is added to the resin mixture before addition of the strong acid.

3. Process according to claim 2 wherein 0.1 to 5 parts by weight of an emulsifying agent per 100 parts by weight of resin is added to the resin mixture.

4. Process according to claim 2 wherein 1 to 10 parts by weight of furfuryl alcohol is employed per 100 parts by weight of resin.

5. Process according to claim 4 wherein 10 to 20 parts by weight of a blowing agent is added per 100 parts by weight of resin.

6. Process according to claim 5 wherein the blowing agent is a water-immiscible, volatile solvent having a boiling point between 30° C. and 100° C.

7. Process according to claim 2 wherein 10 to 40 parts by weight of a strong acid, per 100 parts by weight of resin, is employed as the curing agent.

8. Process to claim 7 wherein 15 to 30 parts by weight of a strong acid, per 100 parts by weight of resin, is employed as curing agent.

9. Process according to claim 2 wherein the strong acid is hydrochloric acid, an aromatic sulphonic acid, phosphoric acid, or a mixture of these acids.

10. Process according to claim 2 wherein the molar ratio of phenol to formaldehyde in the resin is 1:1.2 to 1:3.

11. Process according to claim 10 wherein the molar ratio of phenol to formaldehyde in the resin is 1:1.2 to 1:2.

12. Process according to claim 1 wherein the resin mixture also contains 0.5 to 5 parts by weight of resorcinol, per 100 parts by weight of resin.

13. Process according to claim 2 wherein 0.1 to 10 parts by weight of an emulsifying agent per 100 parts by weight of resin is added to the resin mixture before addition of the strong acid.

14. Process according to claim 13 wherein 0.1 to 5 parts by weight of an emulsifying agent per 100 parts by weight of resin is added to the resin mixture.

15. Process according to claim 2 wherein 1 to 10 parts by weight of (2,3-dihydro-4H-pyran-2-yl)methyl-2,3-dihydro-4H-pyran-2-carboxylate is employed per 100 parts by weight of resin.

16. Process according to claim 15 wherein 10 to 20 parts by weight of the blowing agent is added per 100 parts by weight of resin.

17. Process according to claim 15 wherein the blowing agent is a water-immiscible, volatile solvent having a boiling point between 30° C. and 100° C.

18. Process according to claim 15 wherein 10 to 40 parts by weight of a strong acid, per 100 parts by weight of resin, is employed as curing agent.

19. Process according to claim 18 wherein 15 to 20 parts by weight of a strong acid, per 100 parts by weight of resin, is employed as curing agent.

20. Process according to claim 15 wherein the strong acid is hydrochloric acid, an aromatic sulphonic acid, phosphoric acid, or a mixture of these acids.

21. Process according to claim 15 wherein the molar ratio of phenol to formaldehyde in the resin is 1:1.2 to 1:3.

22. Process according to claim 21 wherein the molar ratio of phenol to formaldehyde in the resin is 1:1.2 to 1:2.

23. Process according to claim 15 wherein the resin mixture also contains 0.5 to 5 parts by weight of resorcinol per 100 parts by weight of resin.

24. A self-expanding, self-hardening mass, for the preparation of foam structures, which comprises an intimate mixture of 100 parts by weight of a phenol-formaldehyde resin, 0.5 to 15 parts of furfuryl alcohol or (2,3 - dihydro - 4H-pyran-2-yl)methyl-2,3-dihydro-4H-pyran-2-carboxylate, 5 to 30 parts of a blowing agent, and a strong acid.

25. A rigid, lightweight cellular foam comprising 100 parts by weight of a cured phenol-formaldehyde resin and 0.5 to 15 parts of furfuryl alcohol polymerised in situ.

26. A rigid lightweight cellular foam comprising 100 parts by weight of a cured phenol-formaldehyde resin and 0.5 to 15 parts of (2,3-dihydro-4H-pyran-2-yl)methyl-2,3-dihydro-4H-pyran-2-carboxylate polymerised in situ.

27. A rigid, lightweight cellular foam prepared by the process claimed in claim 2.

28. A rigid lightweight cellular foam prepared by the process claimed in claim 2.

29. A mould comprising a rigid cellular foam of 100 parts by weight of cured phenol-formaldehyde resin and 0.5 to 15 parts of furfuryl alcohol polymerised in situ.

30. A mould comprising a rigid cellular foam of 100 parts by weight of cured phenol-formaldehyde resin and 0.5 to 15 parts of (2,3-dihydro-4H-pyran-2-yl)methyl-2,3-dihydro-4H-pyran-2-carboxylate polymerised in situ.

31. A foam according to claim 25 comprising 100 parts by weight of a cured resin prepared from phenol and formaldehyde in the molar ratio 1:1.2 to 1:3, and 2 to 5 parts by weight of furfuryl alcohol polymerised in situ.

32. A foam according to claim 31 wherein the molar ratio of phenol to formaldehyde is 1:1.2 to 2.

33. A self-expanding, self-hardening mass, for the preparation of foam structures, which comprises an intimate mixture of 100 parts by weight of a phenol-formaldehyde resin, 0.5 to 15 parts of (2,3-dihydro-4H-pyran-2-yl)methyl-2,3-dihydro-4H-pyran-2-carboxylate, 5 to 30 parts of a blowing agent, and a strong acid.

References Cited

UNITED STATES PATENTS 2,802,240   8/1957   Thomas   260—2.5 F
3,311,575   3/1967   Graham   260—2.5 F MURRAY TILLMAN, Primary Examiner M. FOELAK, Assistant Examiner U.S. Cl. X.R.

260—56, 829, 838

PO-1050
(5/69)

UNITED STATES PATENT OFFICE
CERTIFICATE OF CORRECTION

Patent No. 3,692,706                 Dated September 19, 1972

Inventor(s) Graham Arthur Igglesden

It is certified that error appears in the above-identified patent and that said Letters Patent are hereby corrected as shown below:

Column 7, line 21, delete "20" and substitute --- 30 ---.

Column 8, line 11, delete "2" and substitute --- 15 ---.

Signed and sealed this 21st day of May 1974.

(SEAL)
Attest:

EDWARD M.FLETCHER,JR.
Attesting Officer

C. MARSHALL DANN
Commissioner of Patents